(12) United States Patent
Tomatsu et al.

(10) Patent No.: US 10,168,174 B2
(45) Date of Patent: Jan. 1, 2019

(54) AUGMENTED REALITY FOR VEHICLE LANE GUIDANCE

(71) Applicant: TOYOTA JIDOSHA KABUSHIKI KAISHA, Toyota-shi, Aichi-ken (JP)

(72) Inventors: Nobuyuki Tomatsu, Toyota (JP); Siyuan Dai, Mountain View, CA (US); Yusuke Kashiba, Toyota (JP)

( * ) Notice: Subject to any disclaimer, the term of this patent is extended or adjusted under 35 U.S.C. 154(b) by 0 days.

(21) Appl. No.: 15/591,100

(22) Filed: May 9, 2017

(65) Prior Publication Data

US 2018/0328752 A1 Nov. 15, 2018

(51) Int. Cl.

| G01C 21/36 | (2006.01) |
|---|---|
| G01S 19/42 | (2010.01) |
| G06T 19/00 | (2011.01) |
| G06F 3/01 | (2006.01) |
| G06K 9/00 | (2006.01) |
| G02B 27/01 | (2006.01) |

(52) U.S. Cl.
CPC ....... *G01C 21/3658* (2013.01); *G01C 21/365* (2013.01); *G01S 19/42* (2013.01); *G02B 27/0101* (2013.01); *G02B 27/0172* (2013.01); *G06F 3/012* (2013.01); *G06K 9/00798* (2013.01); *G06T 19/006* (2013.01); *G02B 2027/014* (2013.01); *G02B 2027/0141* (2013.01)

(58) Field of Classification Search
CPC ............ G08G 1/167; G08G 1/096725; B60W 2550/402; B60W 50/14; B60W 2050/0078; B60W 40/06; B60W 2050/146; G01S 2013/9357; G01S 19/42; G01S 2013/9375; G01C 21/26; G01C 21/3658; G01C 21/365; G06K 9/00798; B60G 17/016; B60R 1/00; B60T 2201/08
See application file for complete search history.

(56) References Cited

U.S. PATENT DOCUMENTS

| 9,031,758 B1 * | 5/2015 | Goudy ................. G08G 1/163 |
|---|---|---|
| | | 701/70 |
| 9,239,245 B2 | 1/2016 | Ishikawa |
| | (Continued) | |

OTHER PUBLICATIONS

Alam et al., An Instantaneous Lane-Level Positioning Using DSRC Carrier Frequency Offset, IEEE Transactions on Intelligent Transportation Systems, 2012, pp. 1566-1575.*

*Primary Examiner* — Haixia Du
(74) *Attorney, Agent, or Firm* — Burbage Law, P.C.; Jon-Michael Burbage; Elizabeth Ruzich

(57) ABSTRACT

The disclosure includes embodiments for providing a graphical overlay depicting lane lines to a vehicle including an augmented reality ("AR") viewing device. A method according to some embodiments includes determining whether environment data indicate that a driver of a vehicle can identify lane lines on a road in front of the vehicle. The method includes responsive to the environment data failing to indicate that the driver of the vehicle can identify the lane lines, generating line data based on the environment data and global positioning system (GPS) data. The method includes generating AR data based on the line data. The method includes providing the AR data to the AR viewing device. The method includes determining based on head position data associated with the AR viewing device, to instruct the AR viewing device to display a graphical overlay depicting the lane lines.

20 Claims, 7 Drawing Sheets

(56) References Cited

U.S. PATENT DOCUMENTS

2016/0178391 A1   6/2016  Clark
2016/0185219 A1*  6/2016  Sakata ..................... G08G 1/16
                                                                                          701/36
2017/0039856 A1*  2/2017  Park ....................... G01C 21/34

* cited by examiner

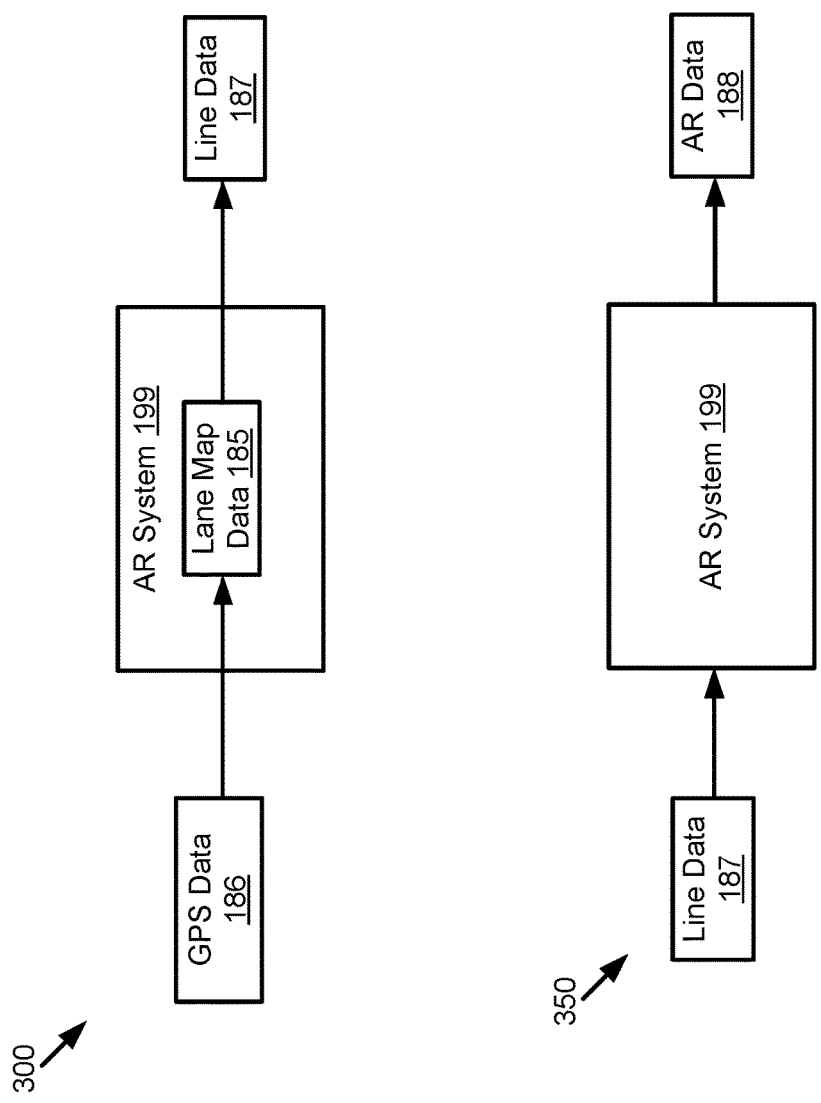

500

550

AUGMENTED REALITY FOR VEHICLE LANE GUIDANCE

BACKGROUND

The specification relates to augmented reality for providing vehicle lane guidance.

In some environment conditions, it may be difficult for a driver of a vehicle to recognize the lane lines in the road. For example, a heavy snowstorm might obscure the lines altogether. In another example, heavy rain and nighttime conditions may cause water to reflect off the road and obscure the lane lines. In yet another example, road repair rubber may reflect sunlight and make it difficult to recognize the lane lines. In another example, some roads may not include lane lines. As a result, it may be difficult for the driver to drive when the lane lines are difficult to detect.

SUMMARY

Described herein is an augmented reality system (herein an "AR system") operable to provide new of different vehicle functionality to a vehicle. Augmented reality may be referred to herein as "AR."

The AR system may be included in a vehicle. The AR system may include AR goggles or a three-dimensional heads-up display (herein a "3D-HUD") that display a graphical overlay of lane lines.

The AR system described herein may provide numerous benefits to improve the performance of a vehicle and the safety of a driver. For example, the AR system determines that a driver cannot view lane lines, for example, because of snow, rain, lighting conditions, rubber on the road, etc. The AR system generates an overlay that includes lane lines so that the driver can see where the lane lines are supposed to be. This increases the driver's safety and makes driving a more pleasant experience because the driver does not have to worry about the location of the lane lines.

In another example benefit, the AR system uses global positioning system (herein "GPS") data with lane-level accuracy to make the experience even safer. A driver views the road at a particular angle where some lane lines are visible and some are not visible. For example, the driver may not be able to view lane lines for lanes that are one or more rows over. If the AR system provided the driver with lane lines that the driver could not view because of the driver's viewing angle, it would be confusing and introduce a potential safety hazard caused by the driver's confusion. Instead, the AR system presents the driver with an AR experience that includes an overlay with only lane lines that the driver would be able to see.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

One general aspect includes a method comprising determining whether environment data indicate that a driver of a vehicle can identify lane lines on a road in front of the vehicle; responsive to the environment data failing to indicate that the driver of the vehicle can identify the lane lines, generating line data based on the environment data and GPS data, wherein the GPS data describe a current location of the vehicle; generating augmented reality data based on the line data, wherein the AR data describes graphical data that causes an AR viewing device to display the lane lines; providing the AR data to the AR viewing device; determining based on head position data associated with the AR viewing device, whether to instruct the AR viewing device to display a graphical overlay depicting the lane lines; and responsive to determining to instruct the AR viewing device to display the graphical overlay depicting the lane lines, instructing the AR viewing device to display the graphical overlay depicting the lane lines.

Implementations may include one or more of the following features. The method where the AR viewing device is at least one of AR goggles and a 3D-HUD. The method where determining whether the environment data indicates that the driver of the vehicle can identify the lane lines is based on using object priors. The method further comprising responsive to the environment data indicating that the driver can identify the lane lines, determining whether a predetermined amount of time occurred and responsive to the predetermined amount of time occurring, determining whether the environment data indicates that the driver of the vehicle can identify the lane lines on the road. The method where generating the line data from the environment data and GPS data includes: retrieving the GPS data for the current location of the vehicle from dedicated short range communication (herein "DSRC") compliant GPS unit, determining a portion of a lane map that corresponds to the GPS data for the current location, wherein the lane map describes the lane lines for a geographic area, and generating the line data based on the portion of the lane map. The method further comprising determining the current location of the vehicle based on one or more of (1) the environment data received from an external sensor, (2) the GPS data received from a DSCR-compliant GPS unit of the vehicle, and (3) a localization map. The method further comprising responsive to determining not to instruct the AR viewing device to display the graphical overlay: determining whether a predetermined amount of time occurred and responsive to the predetermined amount of time occurring, determining, based on the head position data associated with the AR viewing device, whether to instruct the AR viewing device to display the graphical overlay. The method further comprising determining whether the driver is currently at risk, responsive to determining that the driver is currently at risk, generating a warning for the driver, and instructions to the AR viewing device to display the warning. The method further comprising storing the AR data in a buffer associated with the AR viewing device.

One general aspect includes a system comprising: an onboard vehicle computer system including a non-transitory memory storing computer code which, when executed by the onboard vehicle computer system causes the onboard vehicle computer system to: determine whether environment data indicate that a driver of a vehicle can identify lane lines on a road in front of the vehicle; responsive to the environment data failing to indicate that the driver of the vehicle can identify the lane lines, generating line data based on the environment data and GPS data, wherein the GPS data describe a current location of the vehicle; generating AR data based on the line data, wherein the AR data describes graphical data that causes an AR viewing device to display the lane lines; providing the AR data to the AR viewing device; determining based on head position data associated with the AR viewing device, whether to instruct the AR viewing device to display a graphical overlay depicting the lane lines; and responsive to determining to instruct the AR viewing device to display the graphical overlay depicting the lane lines, instructing the AR viewing device to display the graphical overlay depicting the lane lines; and the AR viewing device coupled to the onboard vehicle computer system, the AR viewing device operable to receive the graphical overlay depicting the lane lines from the onboard vehicle computer system and display the graphical overlay depicting the lane lines.

Implementations may include one or more of the following features. The system, where the AR viewing device is at least one of AR goggles and a 3D-HUD. The system, where code, when executed by the onboard vehicle computer system causes the onboard vehicle computer system to responsive to the environment data indicating that the driver can identify the lane lines: determine whether a predetermined amount of time occurred; and responsive to the predetermined amount of time occurring, determine whether the environment data indicates that the driver of the vehicle can identify the lane lines on the road. The system, where generating the line data from the environment data and GPS data includes: retrieving the GPS data for the current location of the vehicle from a DSRC-compliant GPS unit; determining a portion of a lane map that corresponds to the GPS data for the current location, wherein the lane map describes the lane lines for a geographic area; and generating the line data based on the portion of the lane map. The system, where the onboard vehicle computer system includes additional code which, when executed by the onboard vehicle computer system causes the onboard vehicle computer system to determine the current location of the vehicle based on one or more of (1) the environment data received from an external sensor, (2) the GPS data received from a DSCR-compliant GPS unit of the vehicle, and (3) a localization map.

One general aspect includes computer program product comprising a non-transitory memory of an onboard vehicle computer system of a vehicle storing computer-executable code that, when executed by the onboard vehicle computer system, causes the onboard vehicle computer system to: determine whether environment data indicate that a driver of a vehicle can identify lane lines on a road in front of the vehicle; responsive to the environment data failing to indicate that the driver of the vehicle can identify the lane lines, generate line data based on the environment data and GPS data, wherein the GPS data describe a current location of the vehicle; generate AR data based on the line data, wherein the AR data describes graphical data that causes an AR viewing device to display the lane lines; provide the AR data to the AR viewing device; determine based on head position data associated with the AR viewing device, whether to instruct the AR viewing device to display a graphical overlay depicting the lane lines; and responsive to determining to instruct the AR viewing device to display the graphical overlay depicting the lane lines, instruct the AR viewing device to display the graphical overlay depicting the lane lines.

Implementations may include one or more of the following features. The computer program product, where the computer-executable code causes the onboard vehicle computer system to responsive to the environment data indicating that the driver can identify the lane lines: determine whether a predetermined amount of time occurred; and responsive to the predetermined amount of time occurring, determine whether the environment data indicates that the driver of the vehicle can identify the lane lines on the road. The computer program product, where generating the line data from the environment data and GPS data includes: retrieving the GPS data for the current location of the vehicle from a DSRC-compliant GPS unit; determining a portion of a lane map that corresponds to the GPS data for the current location, wherein the lane map describes the lane lines for a geographic area; and generating the line data based on the portion of the lane map. The computer program product, where the computer-executable code causes the onboard vehicle computer system to determine the current location of the vehicle based on one or more of (1) the environment data received from an external sensor, (2) the GPS data received from a DSCR-compliant GPS unit of the vehicle, and (3) a localization map. The computer program product where the computer-executable code causes the onboard vehicle computer system to responsive to determining not to instruct the AR viewing device to display the graphical overlay: determine whether a predetermined amount of time occurred; and responsive to the predetermined amount of time occurring, determine, based on the head position data associated with the AR viewing device, whether to instruct the AR viewing device to display the graphical overlay.

BRIEF DESCRIPTION OF THE DRAWINGS

The disclosure is illustrated by way of example, and not by way of limitation in the figures of the accompanying drawings in which like reference numerals are used to refer to similar elements.

FIG. 3 includes block diagrams illustrating how line data is generated from GPS data and AR data is generated from line data according to some embodiments.

DETAILED DESCRIPTION

Figure 1:
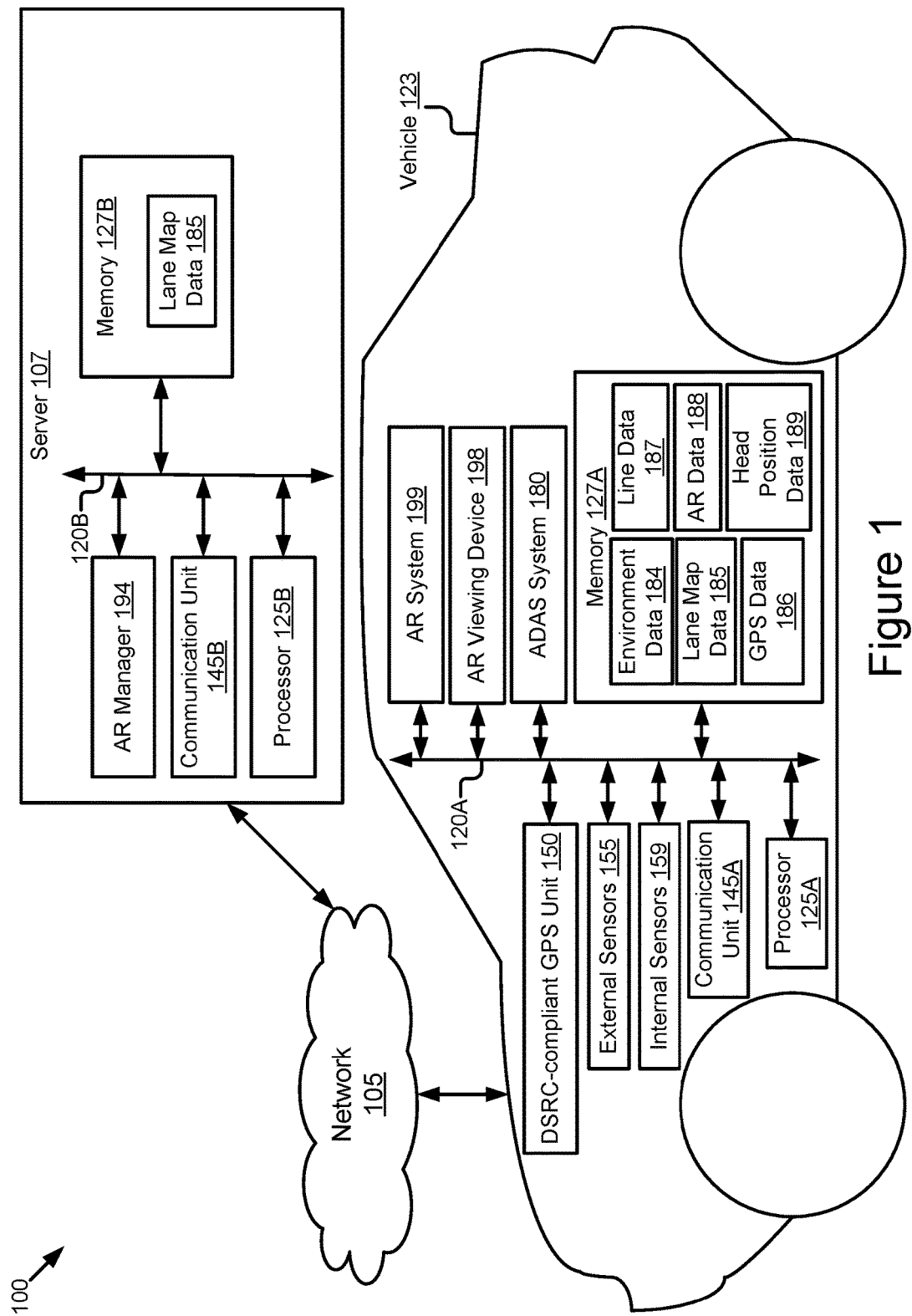
FIG. 1 is a block diagram illustrating an operating environment for a AR system of a vehicle according to some embodiments.

Described herein are embodiments of an AR system included in a vehicle. The AR system is communicatively coupled to a network. The AR system provides new or different vehicle functionality to a vehicle.

Vehicle functionality may include the features that a vehicle is operable to provide to a driver of the vehicle. For example, vehicle functionality may include generation of a graphical overlay of lane lines to help the driver control the vehicle. In another example, vehicle functionality may include features provided by an Advanced Driver Assistance System (herein "ADAS system") of the vehicle. The features provided by the ADAS system are referred to herein as "ADAS features."

As described above, the AR system increases or modifies the vehicle functionality of a vehicle when a driver cannot identify lane lines on a road in front of a vehicle by generating line data based on environment data and GPS data. The AR system generates AR data based on the line data, where the AR data describes graphical data that causes an AR viewing device to display the lane lines.

The line data may be generated in two ways. In a first example, the vehicle may be equipped with a DSRC-compliant GPS unit that is used to generate the GPS data. The AR system may use the environment data and the GPS data to generate a lane map, where the lane map describes the lane lines for a geographic area. The AR system may use the lane map to generate the line data. In a second example, the AR system may determine a current location of the vehicle from environment data received from an external sensor, GPS data received from the DSRC-compliant GPS unit, and a localization map. The AR system may use the current location of the vehicle and the environment data to generate the line data.

In some embodiments, the AR viewing device includes AR goggles or a 3D-HUD. The AR system may provide the AR data to the AR viewing device. The AR viewing device may store the AR data in a buffer for quick access. The AR system may receive head position data associated with the AR viewing device. The AR system may determine, based on the head position data, whether to instruct the AR viewing device to display a graphical overlay depicting the lane lines. For example, if the AR system determines that the road is covered with enough snow to obscure the lane lines, the AR system may determine that the driver cannot see the lane lines. If the AR system determines to instruct the AR viewing device to display the graphical overlay, the AR system provides instructions to the AR viewing device to display the graphical overlay depicting the lane lines.

The AR system will now be described in more detail. The following description focuses on using the AR system to generate the graphical overlay depicting the lane lines. However, in practice the AR system can be used to provide other types of vehicle functions to a vehicle such as using an advanced driver assistance system (ADAS system) to generate a warning for the driver.

Distinguishing Augmented Reality from Virtual Reality

AR and virtual reality ("VR") are not the same thing. In VR, a user is wearing a set of VR goggles, which does not allow the user to see the outside world and a pair of headphones that provide audio that correspond to the images displayed by the VR goggles. The idea is to immerse the user in the VR world so that the user forgets about the real-world entirely.

VR is not suitable for deployment in vehicles since it distracts the driver from the roadway, and so, it is a safety hazard. Our invention does not involve VR for this reason.

In AR, the user is wearing a pair of transparent AR goggles (or glasses or a transparent HUD) that allow the user to completely see the real world. The AR goggles display graphical overlays which enhance the way the real world looks. The graphical overlay may visually appear transparent, translucent, opaque, or solid. The graphical overlay enhances or modifies the way the real-world looks when viewed through the AR goggles. The user may also be wearing an AR glove that enhances the way the real world feels. As a result, AR adds experiences to the real world without causing the user to forget about the real world.

Example Operating Environment

Referring to FIG. 1, depicted is an operating environment 100 for a AR system 199 of a vehicle 123 according to some embodiments. The operating environment 100 may include one or more of the vehicle 123 and a server 107. These elements may be communicatively coupled to one another via a network 105. Although one vehicle 123, one server 107, and one network 105 are depicted in FIG. 1, in practice the operating environment 100 may include one or more vehicles 123, one or more servers 107, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

In some embodiments, the vehicle 123 is a DSRC-equipped vehicle. The network 105 may include one or more communication channels shared among the vehicle 123 and the server 107. The communication channel may include DSRC, LTE vehicle to everything (V2X), full-duplex wireless communication or any other wireless communication protocol. For example, the network 105 may be used to transmit a DSRC message, a DSRC probe, a basic safety message (BSM) or a full-duplex message including any of the data described herein.

The vehicle 123 is any type of vehicle. For example, the vehicle 123 is one of the following types of vehicles: a car; a truck; a sports utility vehicle; a bus; a semi-truck; a drone or any other roadway-based conveyance.

In some embodiments, the vehicle 123 is an autonomous vehicle or a semi-autonomous vehicle. For example, the vehicle 123 includes an ADAS system 180. The ADAS system 180 may be operable provide some or all of the functionality that provides autonomous functionality.

In some embodiments, the vehicle 123 includes one or more of the following elements: a processor 125A; a memory 127A; a communication unit 145A; a DSRC-compliant GPS unit 150; external sensors 155; internal sensors 159; the ADAS system 180; an AR viewing device 198; and an AR system 199. These elements of the vehicle 123 are communicatively coupled to one another via a bus 120A.

The server 107 is a processor-based computing device. For example, the server 107 may include one or more of the following types of processor-based computing devices: a personal computer; a laptop; a mainframe; or any other processor-based computing device that is operable to function as a server. The server 107 may include a hardware server.

In some embodiments, the server 107 includes one or more of the following elements: a processor 125B; a memory 127B; a communication unit 145B; and an AR manager 194. These elements of the server 107 are communicatively coupled to one another via a bus 120B.

The processor 125A of the vehicle 123 and the processor 125B of the server 107 may be referred to herein collectively or individually as the "processor 125" since, for example, the processor 125A of the vehicle 123 provides similar functionality to the components of the vehicle 123 as does the processor 125B of the server 107. For similar reasons, the description provided herein uses the following terms when referring to elements that are common to the vehicle 123 and the server 107: the "memory 127" when referring to the memory 127A and the memory 127B, collectively or individually; and the "communication unit 145" when referring to the communication unit 145A and the communication unit 145B, collectively or individually.

The vehicle 123 and the server 107 are now described.

Vehicle 123

In some embodiments, the processor 125 and the memory 127 may be elements of an onboard vehicle computer system (such as computer system 200 described below with reference to FIG. 2). The onboard vehicle computer system may be operable to cause or control the operation of the AR system 199. The onboard vehicle computer system may be operable to access and execute the data stored on the memory 127 to provide the functionality described herein for the AR system 199 or its elements (see, e.g., FIG. 2). The onboard vehicle computer system may be operable to execute the AR system 199 which causes the onboard vehicle computer system to execute one or more of the steps of the method 700 described below with reference to FIG. 7.

The DSRC-compliant GPS unit 150 may be operable to record GPS data 186 that describes one or more locations of the vehicle 123 at one or more different times. The GPS data 186 may be timestamped to indicate the time when the vehicle 123 was at this particular location. For example, the GPS data 186 may describes the location of the vehicle 123 with lane-level accuracy, thereby generating more accurate line data 187. The GPS data 186 is stored in the memory 127. The DSRC-compliant GPS unit 150 includes hardware to make the GPS compliant with DSRC, such as a DSRC antenna.

The external sensors 155 may include one or more sensors that are operable to measure the physical environment outside of the vehicle 123. For example, the external sensors 155 may record one or more physical characteristics of the physical environment that is proximate to the vehicle 123. The sensors of the external sensors 155 may generate environment data 184. The environment data 184 may describe the recordings measured by the external sensors 155. For example, the external sensors 155 may store images captured by the external sensors 155, such as images captured by cameras, as environment data 184 in the memory 127.

In some embodiments, the external sensors 155 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The internal sensors 159 are sensors that monitor a head position of the driver to generate head position data 189. In some embodiments, the internal sensors 159 are part of the AR viewing device 198.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The vehicle 123 may include one or more memories 127.

The memory 127 of the vehicle 123 may store one or more of the following elements: environment data 184; lane map data 185; GPS data 186; line data 187; AR data 188; and head position data 189.

The environment data 184 describes the environment outside the vehicle 123. The external sensors 155 generate the environment data 184. For example, the environment data 184 may include images captured by the external sensors 155. The AR system 199 analyzes the environment data 184 to determine whether the external conditions indicate that the driver cannot see the lane lines on a road.

The lane map data 185 describes the lane lines for a geographic area. In some embodiments, the lane map data 185 is received from the server 107. In some embodiments, the AR system 199 generates the lane map data 185. The lane map data 185 may be indexed by location data, such as GPS data for easy retrieval of lane lines corresponding to a geographic location.

The GPS data 186 includes information about a current location of the vehicle 123. The GPS data 186 may be received from the DSRC-compliant GPS unit 150 and may describe the current location of the vehicle 123 with such precision that the location of the vehicle 123 within a particular lane may be identified.

The GPS data 186 from the DSRC-compliant GPS unit 150 provides an initial estimate of the position of the vehicle on the roadway. This estimate is improved using the environment data 184 provided by the external sensors 155 and the localization map. The localization map may include 3D information of the road, such as road infrastructure, surrounding buildings, road paint, etc. For example, the localization map may include a 3D shape of the road infrastructure or a position of the road paint or road reflectors. The environment data 184 may also include 3D information as captured by the external sensors 155, such as images of partially visible road paint.

The line data 187 includes information about the location of lane lines in a particular location on a road. The line data 187 may be generated based on the lane map data 185 and the GPS data 186. For example, the AR system 199 may use the GPS data 186 that describes the current location of the vehicle 123 to identify the line data 187 within the lane map data 185 for the current location of the vehicle 123. In some embodiments, the AR system 199 may provide the AR manager 194 with the GPS data 186 that describes the current location of the vehicle 123 and the AR system 199 may receive the corresponding line data 187.

The AR data 188 describes graphical data that causes the AR viewing device 198 to display the lane lines. For example, the AR data 188 describes a graphical overlay depicting lane lines to be displayed by the AR viewing device 198 on top of a view of a road.

The head position data 189 describes the orientation of the driver's head while the driver is wearing the AR viewing device 198. For example, the head position data 189 may include rotation vectors with roll, pitch, and yaw coordinates. The AR system 199 determines, based on the head position data 189, where the driver is looking and how to instruct the AR viewing device 198 to position the overlay that includes the lane lines.

The AR system 199 may provide GPS coordinates for the current location of the vehicle and identify line data 187 from the lane map data 185 that describes lane lines for the geographic location where the vehicle is located. The AR system 199 may repeat this process in real time so that the AR viewing device 198 receives up-to-date information for the line data 187.

The communication unit 145 transmits and receives data to and from a network 105 or to another communication channel. In some embodiments, the communication unit 145 may include a DSRC transceiver, a DSRC receiver and other hardware or software necessary to make the vehicle 123 (or some other device such as the server 107) a DSRC-enabled device.

In some embodiments, the communication unit 145 includes a port for direct physical connection to the network 105 or to another communication channel. For example, the communication unit 145 includes a universal serial bus (USB), secure digital (SD), CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The ADAS system 180 may include one or more advanced driver assistance systems. Examples of an ADAS system 180 may include one or more of the following elements of the vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems 180 provide their own features and functionality that may be referred to herein as a "ADAS feature" or an "ADAS functionality," respectively.

In some embodiments, the ADAS system 180 includes any hardware or software that controls one or more operations of the vehicle 123 so that the vehicle 123 is "autonomous" or "semi-autonomous."

The AR viewing device 198 is any conventional AR headset, goggles or glasses. Examples of the AR viewing device 198 may include one or more of the following: Google™ Glass; CastAR; Moverio BT-200; Meta; Vuzix M-100; Laster SeeThru; Icis; Optinvent ORA-S; GlassUP; Atheer One; K-Glass; and Microsoft™ Hololens. The AR viewing device 198 is configured so that a driver of the vehicle 123 can be focused on the driving experience when operating the vehicle 123. The AR viewing device 198 generates head position data 189 that describes the orientation of the driver's head while the driver is wearing the AR viewing device 198. In some embodiments, the AR viewing device 198 may include additional equipment such as AR gloves to manipulate virtual objects displayed by the AR viewing device 198.

Figure 6:
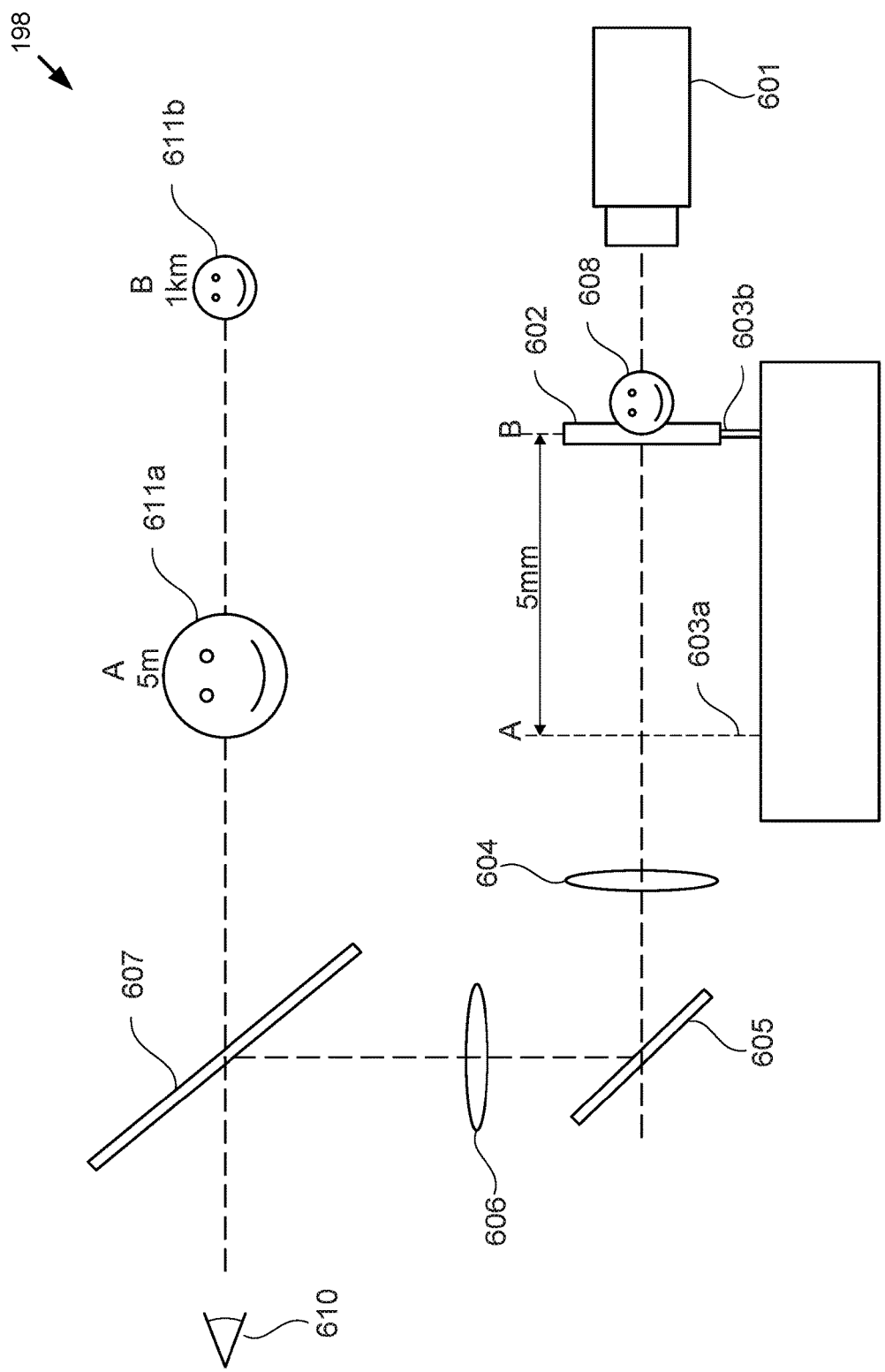
FIG. 6 is a block diagram illustrating a 3D-HUD according to some embodiments.

In some embodiments, the AR viewing device 198 is a 3D-HUD. An example of the 3D-HUD is depicted in FIG. 6. For example, a driver of the vehicle 123 may view the 3D-HUD and the 3D-HUD may display the graphical overlay of lane lines provided to the vehicle 123 by the AR system 199. The 3D-HUD is described in more detail below with reference to FIG. 6.

As described in more detail below, the AR viewing device 198 may include a non-transitory cache or buffer that temporarily stores data that it receives from the AR system 199.

In some embodiments, the AR system 199 may include code or routines that uses the communication unit 145 of the vehicle 123 to communicate with an AR manager 194 stored on the server 107 via the network 105. The AR manager 194 may provide the AR system 199 with data needed for the AR system 199 and the AR viewing device 198 to provide an AR experience to the driver that includes a graphical overlay of lane lines. For example, the AR manager 194 may provide the AR system 199 with lane map data 185.

In some embodiments, the AR system 199 of the vehicle 123 may be implemented using hardware including a field-programmable gate array ("FPGA") or an application-specific integrated circuit ("ASIC"). In some other embodiments, the AR system 199 may be implemented using a combination of hardware and software. The AR system 199 may be stored in a combination of the devices (e.g., servers or other devices), or in one of the devices.

The AR system 199 monitors the external environment using the environment data 184 to determine whether the driver is unable to view the road lines. If the environment data 184 indicates that the driver cannot view the road lines, then the AR system 199 causes the DSRC-compliant GPS unit 150 to retrieve GPS data 186 describing the vehicle's 123 current location. The AR system 199 generates line data 187 from the GPS data 186. The AR system 199 then generates AR data 188 based on the line data 187. The AR data 188 includes graphical data for causing the AR viewing device 198 to display lane lines that are described by the line data. The AR system 199 is described in more detail below with reference to FIGS. 2, 3, 4A, 4B, 5A, 5B, and 7.

Server 107

In some embodiments, the server 107 is a cloud server that includes an AR manager 194, a memory 127B, a processor 125B, and a communication unit 145B. The memory 127 stores any data needed for the AR system 199 and the AR viewing device 198 to provide new or different vehicle functionality to the vehicle 123 that would not otherwise be available to the driver of this particular vehicle 123. For example, the memory 127 may include lane map data 185 that describes lane lines for a geographic area. Although the AR system 199 may be able to generate lane map data 185, the AR system 199 may be able to generate a graphical overlay depicting lane lines faster if the AR system 199 does not also have to generate the lane map data 185.

The following elements of the server 107 are the same or similar to those described above for the vehicle 123, and so, the descriptions of these elements will not be repeated here: the processor 125B; the memory 127B; and the communication unit 145B. The communication unit 145B handles communications between the server 107 and the vehicle 123 via the network 105.

Although not depicted in FIG. 1, in some embodiments the AR manager 194 may include a full-duplex coordination system as described in U.S. patent application Ser. No. 14/471,387 filed on Aug. 28, 2014 and entitled "Full-Duplex Coordination System."

The AR manager 194 includes code and routines that are operable, when executed by the processor 125 of the server 107, to generate a lane map and store the lane map and other information as lane map data 185 in the memory 127. The lane map describes where lane lines for a roadway should be located. In some embodiments, the AR manager 194 receives images of roads from one or more sources, such as vehicles in a geographic area. The images are associated with a location where each image was taken. For example, the images may be associated with GPS coordinates.

The AR manager 194 generates the lane map from the images. For example, the AR manager 194 may perform object recognition on the images to identify the boundaries of the roads and identify the location of lane lines within the images if they are visible. In some embodiments where lane lines are not present, the AR manager 194 may estimate the location where lane lines should be present. For example, the AR manager 194 may identify the width of the road and estimate that the lane lines should be at the edges of the road (or a few feet away to provide a shoulder) and in the middle of the road.

The AR manager 194 provides the lane map data 185 to the vehicle 123. In some embodiments, the AR manager 194 receives a location of the vehicle 123 and provides lane map data 185 that corresponds to the location of the vehicle 123.

Example Computer System

Figure 2:
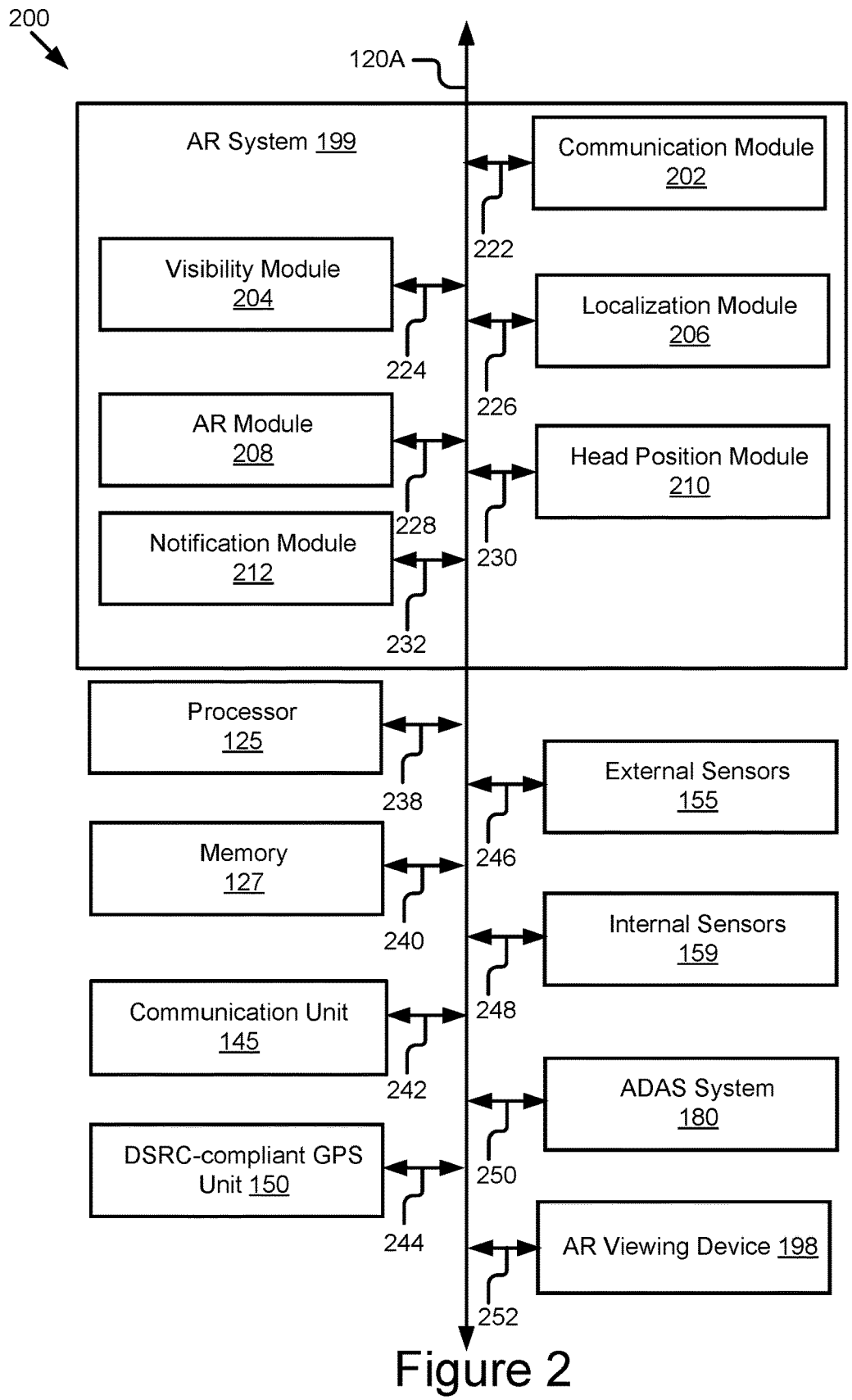
FIG. 2 is a block diagram illustrating an example computer system including the AR system of a vehicle according to some embodiments.

Referring now to FIG. 2, depicted is a block diagram illustrating an example computer system 200 including a AR system 199 according to some embodiments.

In some embodiments, the computer system 200 may include a special-purpose computer system that is programmed to perform one or more steps of a method 700 described below with reference to FIG. 7.

In some embodiments, one or more components of the computer system 200 may be part of the server 107.

In some embodiments, the computer system 200 may be an onboard vehicle computer of the vehicle 123.

In some embodiments, the computer system 200 may include an electronic control unit, head unit or some other processor-based computing device of the vehicle 123.

The computer system 200 may include one or more of the following elements according to some examples: the AR system 199; the processor 125; the memory 127; the communication unit 145; the DSRC-compliant GPS unit 150; the external sensors 155; the internal sensors 159; the ADAS system 180; and the AR viewing device 198. The components of the computer system 200 are communicatively coupled by a bus 120.

In the illustrated embodiment, the processor 125 is communicatively coupled to the bus 120 via a signal line 238. The memory 127 is communicatively coupled to the bus 120 via a signal line 240. The communication unit 145 is communicatively coupled to the bus 120 via a signal line 242. The DSRC-compliant GPS unit 150 is communicatively coupled to the bus 120 via a signal line 244. The external sensors 155 are communicatively coupled to the bus 120 via a signal line 246. The internal sensors 159 are communicatively coupled to the bus 120 via a signal line 248. The ADAS system 180 is communicatively coupled to the bus 120 via a signal line 250. The AR viewing device 198 is communicatively coupled to the bus 120 via a signal line 252.

The following elements of the computer system 200 were described above with reference to FIG. 1, and so, those descriptions will not be repeated here: the processor 125; the memory 127; the communication unit 145; the DSRC-compliant GPS unit 150; the external sensors 155; the internal sensors 159; the ADAS system 180; and the AR viewing device 198.

The memory 127 may store any of the data described above with reference to FIG. 1. The memory 127 may store any data needed for the computer system 200 to provide its functionality.

Examples of an ADAS system may include one or more of the following elements of an ego vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in a vehicle that makes that ego vehicle be an autonomous vehicle or a semi-autonomous vehicle.

The AR system 199 described herein with reference to FIG. 1 may include code and routines that is operable to "turn on" the ADAS software for a vehicle so that this ADAS software and its corresponding ADAS hardware are operable to provide some or all of this hidden ADAS functionality. Moreover, the AR viewing device 198 may display a graphical overlay with a virtualized version of a control element that the driver of the vehicle can use to engage, disengage or otherwise control the operation of this previously hidden ADAS system.

In the illustrated embodiment shown in FIG. 2, the AR system 199 includes a communication module 202, a visibility module 204, a localization module 206, an AR module 208, a head position module 210, and a notification module 212.

The communication module 202 can be software including routines for handling communications between the AR system 199 and other components of the computer system 200. In some embodiments, the communication module 202 can be a set of instructions executable by the processor 125 to provide the functionality described below for handling communications between the AR system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, one or more of the following elements: the environment data 184; the lane map data 185; the GPS data 186; the line data 187; the AR data 188; and the head position data 189. The communication module 202 may send or receive any of the data or messages described above with reference to FIG. 1 or below with reference to FIGS. 3 and 7 via the communication unit 145.

In some embodiments, the communication module 202 receives data from components of the AR system 199 and stores the data in the memory 127 (or a buffer or cache of the AR viewing device 198). For example, the communication module 202 receives any of the data described above with reference to the memory 127 from the communication unit 145 (via the network 105) and stores this data in the memory 127 (or a buffer or cache of the AR viewing device 198).

In some embodiments, the communication module 202 may handle communications between components of the AR system 199. For example, the communication module 202 may transmit head position data 189 from the head position module 210 to the AR module 208.

The visibility module 204 can be software including routines for determining a visibility of a road in front of the vehicle 123. In some embodiments, the visibility module 204 can be a set of instructions executable by the processor 125 to provide the functionality described below for determining visibility. In some embodiments, the visibility module 204 can be stored in the memory 127 of the computer system 200 and can be accessible and executable by the processor 125. The visibility module 204 may be adapted for cooperation and communication with the processor 125 and other components of the computer system 200 via signal line 224.

The visibility module 204 receives environment data 184 from the external sensors 155 or retrieves the environment data 184 from the memory 127. For example, the visibility module 204 receives images of the road in front of the vehicle 123.

The visibility module 204 determines whether the environment data 184 indicates that the driver of the vehicle 123 can identify lane lines on the road in front of the vehicle 123. For example, the road may be covered in snow and the snow may obscure the lane lines of the road. In some embodiments, the visibility module 204 identifies the lane lines on the road based on using object priors. For example, the visibility module 204 may perform object recognition on the images included in the environment data 184 and compare the objects in the images to reference objects to identify the location of the lane lines within the images.

The visibility module 204 may apply a recognition score to the lane lines within the images and determine that the driver cannot identify the lane lines if the recognition score falls below a predetermined threshold (or exceeds a predetermined threshold, depending on how the recognition score is configured). For example, if the recognition score indicates that the driver can see less than 50% of the lane lines on the road, the visibility module 204 may determine that the driver cannot identify the lane lines.

If the visibility module 204 determines that the environment data 184 indicates that the driver can identify the lane lines, the visibility module 204 may wait a predetermined amount of time until performing the determining step again. For example, the visibility module 204 may perform a determining step loop every 30 seconds until the visibility module 204 determines that the driver cannot identify the lane lines. If the visibility module 204 determines that the environment data 184 indicates that the driver cannot identify the lane lines, the visibility module 204 may instruct the localization module 206 to generate line data 187.

The localization module 206 can be software including routines for generating line data 187. In some embodiments, the localization module 206 can be a set of instructions executable by the processor 125 to provide the functionality described below for generating the line data 187. In some embodiments, the localization module 206 can be stored in the memory 127 of the computer system 200 and can be accessible and executable by the processor 125. The localization module 206 may be adapted for cooperation and communication with the processor 125 and other components of the computer system 200 via signal line 226.

The localization module 206 may use GPS data 186 to determine the current location of the vehicle 123. In some embodiments, the GPS data 186 may be generated by the DSRC-compliant GPS unit 150 and describe the current location of the vehicle 123. Because the GPS unit is a DSRC-compliant GPS unit 150 and the DSRC standard requires that all GPS data include enough precision to describe the lane of travel of the vehicle 123, the GPS data is accurate to within plus or minus three meters. By comparison, GPS data for non-DSRC-compliant GPS units is only accurate to within plus or minus 10 meters.

In some embodiments, localization module 206 may determine the current location of the vehicle 123 based on environment data 184 received from the external sensors 155, GPS data 186 received from the DSRC-compliant GPS unit 150, and a localization map. The localization module 206 may use the GPS data 186 received from the DSRC-compliant GPS unit 150, such as GPS data, to determine an initial estimate of the position of the vehicle 123 on the road. The localization module 206 may revise the position of the vehicle 123 on the road based on the environment data 184 and the localization map. The localization map may include 3D information about the road, such as a 3D shape of the road infrastructure and a position of the road paint or reflectors. The localization module 206 may revise the position of the vehicle 123 by calculating a deviation between the environment data 184 and the localization map and use the deviation to determine the current position of the vehicle 123.

The localization module 206 generates line data 187 based on the GPS data 186 and lane map data 185. The localization module 206 may retrieve lane map data 185 that describes the lane lines for a geographic area. The localization module 206 may generate a lane map from the environment data 184 obtained from the external sensors 155. In another example, the localization module 206 may receive lane map data 185 from the AR manager 194 stored on the server 107.

The localization module 206 may determine a portion of the lane map that corresponds to the GPS data for the current location. The localization module 206 may generate line data 187 based on the portion of the lane map. The line data 187 describes where the lane lines should be visible to the driver when the driver looks at the road. For example, FIG. 3 includes a block diagram 300 illustrating how the line data 187 is generated from the GPS data 186 by providing the GPS data 186 to the lane map data 185 so that the AR system 199 (or more specifically, the localization module 206) can provide line data 187 that is particular to the current location of the vehicle 123. The localization module 206 may generate the line data 187 in real-time so that the AR viewing device 198 has up-to-date line data 187.

The AR module 208 can be software including routines for generating AR data 188. In some embodiments, the AR module 208 can be a set of instructions executable by the processor 125 to provide the functionality described below for generating the AR data 188. In some embodiments, the AR module 208 can be stored in the memory 127 of the computer system 200 and can be accessible and executable by the processor 125. The AR module 208 may be adapted for cooperation and communication with the processor 125 and other components of the computer system 200 via signal line 228.

The AR module 208 generates AR data 188 based on the line data 187. The AR data 188 describes graphical data that causes an AR viewing device 198 to display the lane lines over a view of the road. For example, the AR module 208 may generate graphical instructions for the AR viewing device 198 to display an overlay depicting the lane lines.

FIG. 3 includes a block diagram 350 illustrating how AR data 188 is generated from line data 187 according to some embodiments. The AR system 199, or more particularly the AR module 208, uses the line data 187 to generate an overlay that includes AR data 188 describing lane lines, such as edges of the road and dividing lines between lanes. The overlay may include the different types of lane lines that are applicable, such as solid lane lines that prohibit passing, dashed lane lines that indicate that passing is permitted, and the different combinations of solid and dashed lane lines that indicate that passing is permitted for drivers on one side of the road but not drivers on the other side of the road.

Figure 4A:
FIG. 4A is an example view of a road where the lane lines are obscured by snow.
Figure 4B:
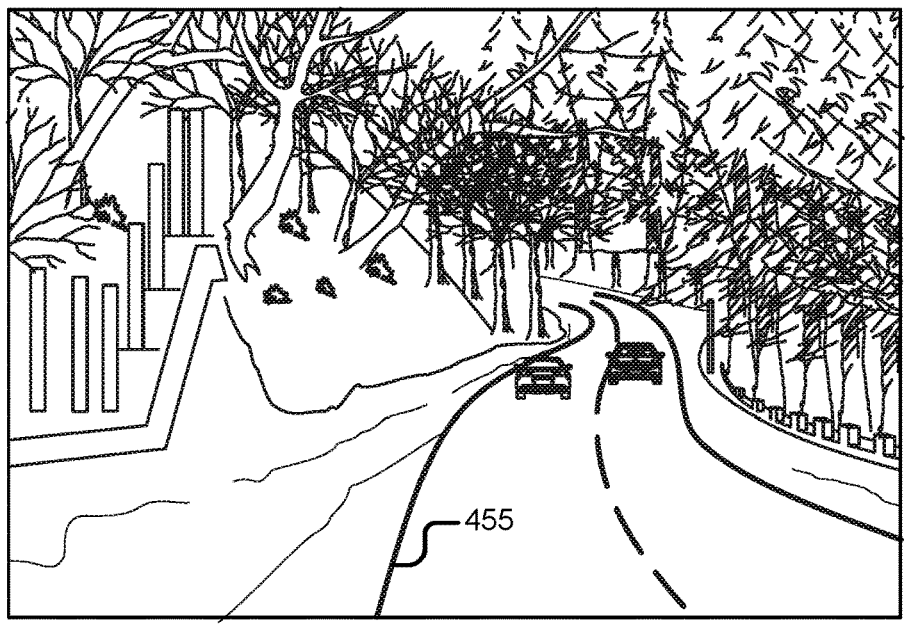
FIG. 4B is an example view of the road of FIG. 4A with a graphical overlay depicting lane lines on the road according to some embodiments.

FIG. 4A is an example view 400 of a road where the lane lines are obscured by snow. In this example, the road has so much snow that the driver cannot make out the edges of the road or the dividing line between the lanes. FIG. 4B is an example view 450 of the road of FIG. 4A with a graphical overlay 455 depicting lane lines on the road according to some embodiments. In this example, the graphical overlay 455 includes lane lines for the edges of the road and a dashed lane line in the center indicating that the drivers may use the other lane for passing.

Figure 5A:
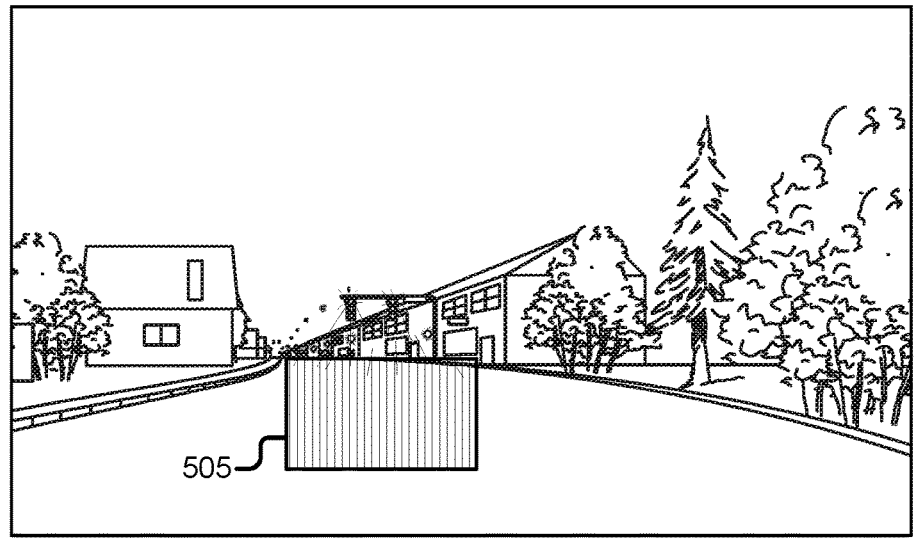
FIG. 5A is an example view of a road at night when rain causes glare on the road that obscures the lane lines.
Figure 5B:
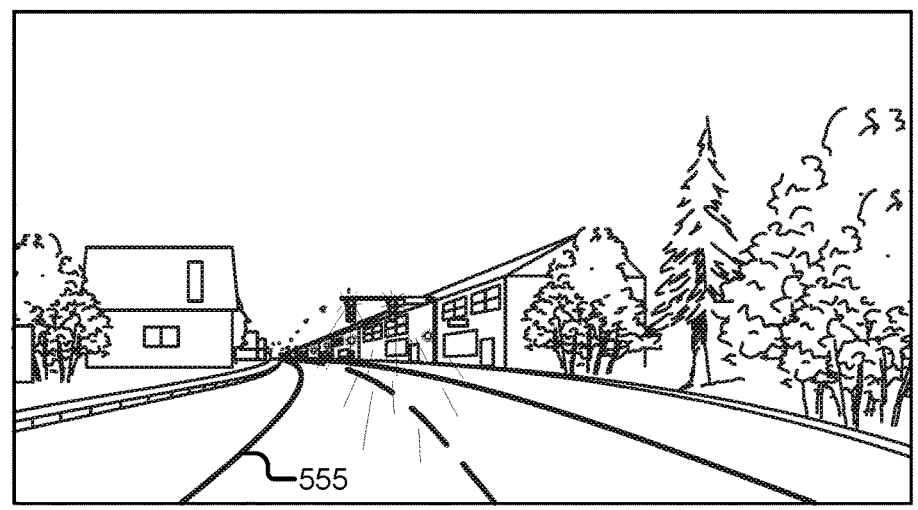
FIG. 5B is an example view of the road of FIG. 5A with a graphical overlay depicting lane lines on the road according to some embodiments.

FIG. 5A is an example view 500 of a road at night when rain causes glare on the road that obscures the lane lines. In this example, box 505 represents an area where the water on the road combined with nighttime conditions results in the road reflecting the traffic lights, street lamps, and car lights such that the lane lines are not visible on the road. FIG. 5B is an example view 550 of the road of FIG. 5B with a graphical overlay 555 depicting lane lines on the road according to some embodiments. In this example, the graphical overlay 555 includes lane lines for the edges of the road and a dashed lane line in the center indicating that the drivers may use the other lane for passing.

The AR module 208 provides the AR data 188 to the AR viewing device 198. For example, the AR module 208 stores the AR data 188 in a buffer of the AR viewing device 198 so that it can be retrieved by the AR viewing device 198 quickly when the driver's head position is oriented such that the drive should be able to see the lane lines in the real world.

The head position module 210 can be software including routines for determining whether to instruct the AR viewing device 198 to display the graphical overlay based on head position data 189. In some embodiments, the head position module 210 can be a set of instructions executable by the processor 125 to provide the functionality described below for determining whether to instruct the AR viewing device 198 to display the graphical overlay. In some embodiments, the head position module 210 can be stored in the memory 127 of the computer system 200 and can be accessible and executable by the processor 125. The head position module 210 may be adapted for cooperation and communication with the processor 125 and other components of the computer system 200 via signal line 230.

The head position module 210 may receive head position data 189 from the AR viewing device 198 or the head position module 210 may retrieve the head position data 189 from the memory 127. The head position data 189 describes the orientation of the driver's head. For example, the head position data 189 may describe roll, pitch, and yaw coordinates for the position of the driver's head.

The head position module 210 determines based on the head position data 189 whether to instruct the AR viewing device 198 to display the graphical overlay depicting the lane lines. For example, if the head position data 189 indicates that the driver is viewing a portion of the real world where the driver should be able to see the lane lines on the road, the head position module 210 instructing the AR viewing device 198 to display the graphical overlay depicting the lane lines.

In some embodiments, if the head position module 210 determines not to instruct the AR viewing device 198 to display the graphical overlay, the head position module 210 waits a predetermined amount of time before performing the determining step again. For example, the head position module 210 may perform the determining loop every two seconds (or one second, every millisecond, etc.) until the head position module 210 determines to instruct the AR viewing device 198 to display the graphical overlay depicting the lane lines.

The notification module 212 can be software including routines for determining whether the driver is currently at risk and generating a notification. In some embodiments, the notification module 212 can be a set of instructions executable by the processor 125 to provide the functionality described below for determining whether the driver is at risk and generating the notification. In some embodiments, the notification module 212 can be stored in the memory 127 of the computer system 200 and can be accessible and executable by the processor 125. The notification module 212 may be adapted for cooperation and communication with the processor 125 and other components of the computer system 200 via signal line 232.

The notification module 212 analyzes the current driving situation to determine whether the driver is currently at risk. For example, the notification module 212 may use the environment data 184 to determine that the snow obscuring the road is a dangerous condition or that black ice up the road may cause the car to slide on the ice. If the notification module 212 determines that the driver is currently at risk, the notification module 212 may generate a warning for the driver and instruct the AR viewing device 198 to display the warning. For example, the warning may state: "Warning: black ice in 10 feet!"

If the notification module 212 determines that the driver is not currently at risk, the notification module 212 may do nothing or the notification module 212 may instruct the AR viewing device 198 to provide a notification that the user is safe, such as an overlay with the word "safe" on the side of where the driver is looking.

In some embodiments, the notification module 212 may interact with the ADAS system 180 so that the ADAS system 180 can initiate remedial action appropriate to the current risk of the driver. For example, if the notification module 212 determines that there is black ice 10 feet from the vehicle 123, the notification module 212 may notify the ADAS system 180 so that the ADAS system 180 will start to slow down the vehicle.

Example 3D-HUD

Referring to FIG. 6, depicted is a block diagram illustrating a AR viewing device 198 in embodiments where the AR viewing device 198 is a 3D-HUD.

In some embodiments, the 3D-HUD includes a projector 601, a movable screen 602, a screen-driving unit 603, an optical system (including lenses 604, 606, a reflector 605, etc.). The projector 601 may be any kind of projector such as a digital mirror device (DMD) project, a liquid crystal projector. The projector 601 projects an image (graphic) 608 on the movable screen 602. The image 608 may include a graphical overlay. For example, the image 608 may be the graphical overlay depicting lane lines as described above with reference to FIG. 2.

The movable screen 602 includes a transparent plate and so the light of the projected image transmits through the movable screen 602 to be projected on the windshield 607 of a vehicle (e.g., the vehicle 123). The image projected on the windshield 607 is perceived by a driver 610 as if it is a real object (shown as 611a, 611b) that exists in the three-dimensional space of the real-world, as opposed to an object that is projected on the windshield.

In some embodiments, the 3D-HUD is capable of controlling the direction of the image relative to the driver 610 (in other words, the image position in the windshield) by adjusting the projection position on the screen 602. Further the screen 602 is movable by the screen-driving unit 603 in the range between the positions 603a and 603b. Adjusting the position of the screen 602 can vary the depth (distance) of the projected image from the driver 610 in the real-world. In one example, the movable range of the screen 602 (distance between positions 603a and 603b) may be 5 mm, which correspond to from 5 m away to infinity in the real-world. The use of the 3D-HUD allows the driver 610 to perceive the projected image exist in the real-world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D-HUD depicted in FIG. 6 is provided by way of example. Other examples are possible. These examples may include heads-up displays having more or less complexity than the 3D-HUD depicted in FIG. 6. For example, it is anticipated that in the future there will be heads-up displays that do not require movable parts such as the movable screen 602. For example, a static screen that does not move may be deployed. The heads-up display deployed may not be a two-dimensional heads-up display unit. In some embodiments, the AR system 199 and the graphical overlay is designed to be operable with such components.

Example Method

Figure 7:
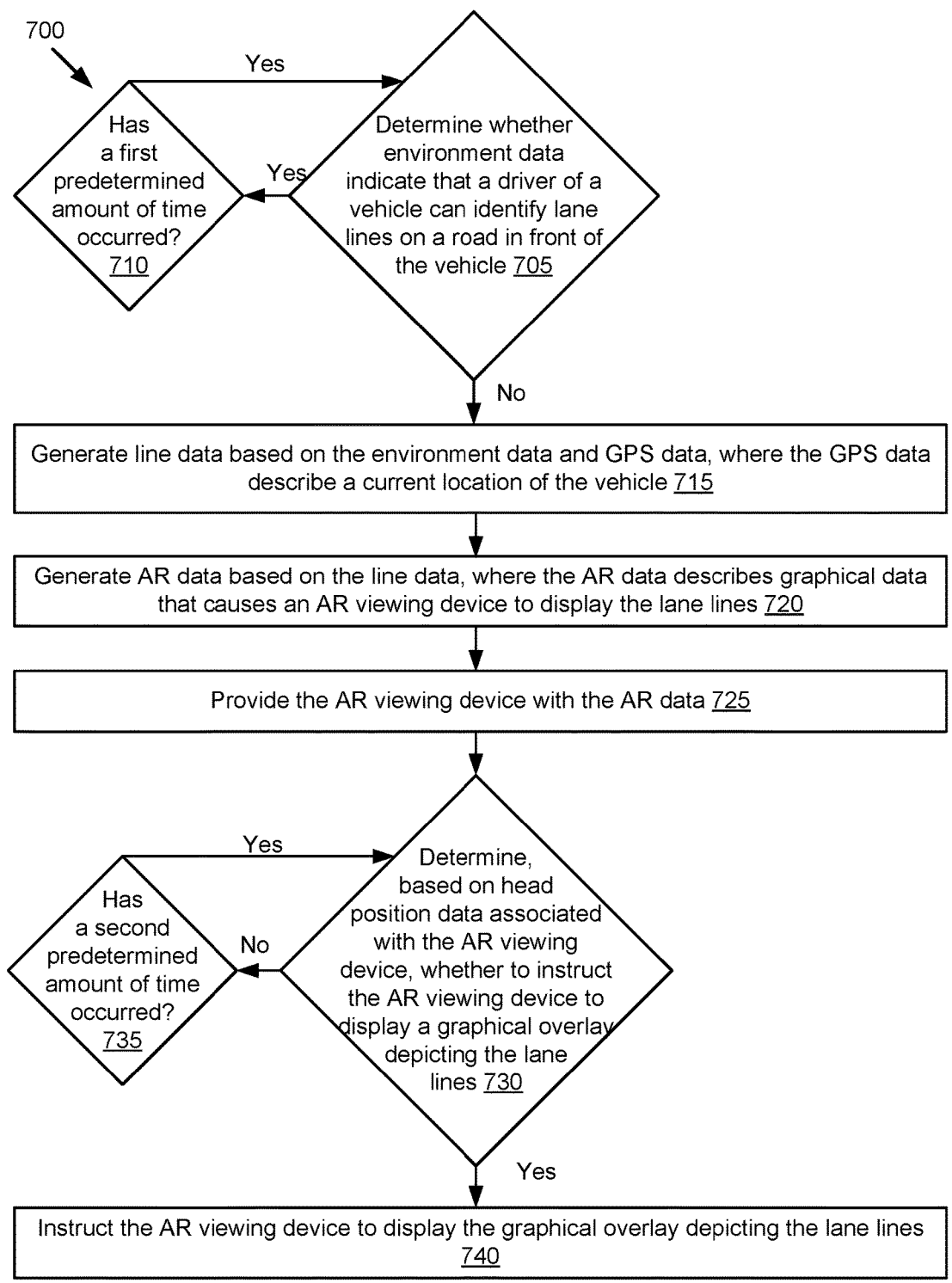
FIG. 7 is an example flow diagram of a method for generating a graphical overlay depicting lane lines on the road according to some embodiments.

Referring now to FIG. 7, depicted is a flowchart of an example method 700 for providing new or different vehicle functionality to a vehicle using an AR system 199 according to some embodiments. The vehicle functionality may be provided by components of the vehicle 123 described above with reference to FIG. 1.

One or more of the steps described herein for the method 700 may be executed by one or more computer systems 200.

Referring now to FIG. 7. At step 705, it is determined whether environment data 184 indicates that a driver of a vehicle 124 can identify lane lines on a road in front of the vehicle. For example, the road may be so obscured by rubber used to fix cracks in the road, that the line lines are obscured. If the driver can identify the line lines on the road, at step 710, it is determined whether a first predetermined amount of time has occurred. Step 710 keeps occurring until the first predetermined amount of time has occurred and step 705 is repeated.

If it is determined that the driver cannot identify the lane lines on the road, at step 715, line data 187 is generated based on the environment data 184 and GPS data 186, where the GPS data 186 describes a current location of the vehicle. The GPS data 186 may be received from a DSRC-compliant GPS unit 150. In some examples, the current location may further be determined from the environment data 184 and a localization map. In some examples, the GPS data 186 is used to obtain line data 187 from a lane map that corresponds to the GPS data 186 for the current location of the vehicle 123.

At step 720, AR data 188 is generated based on the line data 187, where the AR data 188 describes graphical data that causes an AR viewing device 198 to display the lane lines. The AR viewing device 198 may include AR goggles or a 3D-HUD. At step 725, the AR viewing device 198 is provided with the AR data 188.

At step 730, it is determined, based on head position data 189 associated with the AR viewing device 198, whether to instruct the AR viewing device 198 to display a graphical overlay depicting the lane lines. If it is determined to not instruct the AR viewing device 198 to display the graphical overlay, at step 735 it is determined whether a second predetermined amount of time has occurred. Step 735 keeps occurring until the second predetermined amount of time has occurred and step 730 is repeated. The first predetermined amount of time may be different from the second predetermined amount of time.

If it is determined to instruct the AR viewing device 198 to display the graphical overlay, at step 740 the AR viewing device 198 is instructed to display the graphical overlay depicting the lane lines.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
responsive to determining that environment data fails to indicate that a driver of a vehicle can identify lane lines on a road in front of the vehicle, generating line data by:
retrieving global positioning system (GPS) data that describes a location of the vehicle;
determining a portion of a lane map that corresponds to the GPS data for the location, wherein the lane map describes the lane lines for a geographic area; and
generating the line data based on the portion of the lane map;
generating graphical data based on the line data, wherein the graphical data causes a viewing device to display the lane lines;
providing the graphical data to the viewing device; and
determining based on head position data generated by the viewing device to instruct the viewing device to display a graphical overlay depicting the lane lines, wherein the head position data describes an orientation of the driver and the graphical data is modified based on the head position data so that the lane lines included in the graphical overlay displayed by the viewing device includes only lines that would actually be visible by the driver.

2. The method of claim 1, wherein the viewing device is at least one of augmented reality (AR) goggles and a three-dimensional heads-up display (3D-HUD).

3. The method of claim 1, wherein determining whether the environment data indicates that the driver of the vehicle can identify the lane lines is based on using object priors.

4. The method of claim 1, further comprising responsive to the environment data indicating that the driver can identify the lane lines:
determining whether a predetermined amount of time occurred; and
responsive to the predetermined amount of time occurring, determining whether the environment data indicates that the driver of the vehicle can identify the lane lines on the road.

5. The method of claim 1, wherein the GPS data includes timestamps to indicate a time when the vehicle was at the location.

6. The method of claim 1, further comprising determining the location of the vehicle based on one or more of (1) the environment data received from an external sensor, (2) the GPS data received from a dedicated short range communication (DSCR)-compliant GPS unit of the vehicle, and (3) a localization map.

7. The method of claim 1, further comprising responsive to determining not to instruct the viewing device to display the graphical overlay:
determining whether a predetermined amount of time occurred; and
responsive to the predetermined amount of time occurring, determining, based on the head position data associated with the viewing device, whether to instruct the viewing device to display the graphical overlay.

8. The method of claim 1, further comprising:
determining whether the driver is currently at risk;
responsive to determining that the driver is currently at risk, generating a warning for the driver; and
providing instructions to the viewing device to display the warning.

9. The method of claim 1, further comprising:
generating augmented reality (AR) data based on the line data; and
storing the AR data in a buffer associated with the AR viewing device.

10. A system comprising:
an onboard vehicle computer system including a non-transitory memory storing computer code which, when executed by the onboard vehicle computer system causes the onboard vehicle computer system to:
responsive to determining that environment data fails to indicate that a driver of a vehicle can identify lane lines on a road in front of the vehicle, generating line data by:
retrieving global positioning system (GPS) data that describes a location of the vehicle;
determining a portion of a lane map that corresponds to the GPS data for the location, wherein the lane map describes the lane lines for a geographic area; and
generating the line data based on the portion of the lane map;
generating graphical data based on the line data, wherein the graphical data causes a viewing device to display the lane lines;
providing the graphical data to the viewing device; and
determining based on head position data generated by the viewing device, to instruct the viewing device to display a graphical overlay depicting the lane lines, wherein the head position data describes an orientation of the driver and the graphical data is modified based on the head position data so that the lane lines included in the graphical overlay displayed by the viewing device includes only lines that would actually be visible by the driver; and
the viewing device coupled to the onboard vehicle computer system, the viewing device operable to generate the head position data, receive the graphical overlay depicting the lane lines from the onboard vehicle computer system, and display the graphical overlay depicting the lane lines.

11. The system of claim 10, wherein the viewing device is at least one of augmented reality (AR) goggles and a three-dimensional heads-up display (3D-HUD).

12. The system of claim 10, wherein code, when executed by the onboard vehicle computer system causes the onboard vehicle computer system to responsive to the environment data indicating that the driver can identify the lane lines:
- determine whether a predetermined amount of time occurred; and
- responsive to the predetermined amount of time occurring, determine whether the environment data indicates that the driver of the vehicle can identify the lane lines on the road.

13. The system of claim 10, wherein the GPS data includes timestamps to indicate a time when the vehicle was at the location.

14. The system of claim 10, wherein the onboard vehicle computer system includes additional code which, when executed by the onboard vehicle computer system causes the onboard vehicle computer system to determine the location of the vehicle based on one or more of (1) the environment data received from an external sensor, (2) the GPS data received from a dedicated short range communication (DSCR)-compliant GPS unit of the vehicle, and (3) a localization map.

15. A computer program product comprising a non-transitory memory of an onboard vehicle computer system of a vehicle storing computer-executable code that, when executed by the onboard vehicle computer system, causes the onboard vehicle computer system to:
- responsive to determining that environment data fails to indicate that a driver of the vehicle can identify lane lines on a road in front of the vehicle, generate line data by:
  - retrieving global positioning system (GPS) data that describes a location of the vehicle;
  - determining a portion of a lane map that corresponds to the GPS data for the location, wherein the lane map describes the lane lines for a geographic area; and
  - generating the line data based on the portion of the lane map;
- generate graphical data based on the line data, wherein the graphical data that causes a viewing device to display the lane lines;
- provide the graphical data to the viewing device; and
- determine based on head position data generated by the viewing device to instruct the viewing device to display a graphical overlay depicting the lane lines wherein the head position data describes an orientation of the driver and the graphical data is modified based on the head position data so that the lane lines included in the graphical overlay displayed by the viewing device includes only lines that would actually be visible by the driver.

16. The computer program product of claim 15, wherein the viewing device is at least one of augmented reality (AR) goggles and a three-dimensional heads-up display (3D-HUD).

17. The computer program product of claim 15, wherein the computer-executable code causes the onboard vehicle computer system to responsive to the environment data indicating that the driver can identify the lane lines:
- determine whether a predetermined amount of time occurred; and
- responsive to the predetermined amount of time occurring, determine whether the environment data indicates that the driver of the vehicle can identify the lane lines on the road.

18. The computer program product of claim 15, wherein the GPS data includes timestamps to indicate a time when the vehicle was at the location.

19. The computer program product of claim 15, wherein the computer-executable code causes the onboard vehicle computer system to determine the location of the vehicle based on one or more of (1) the environment data received from an external sensor, (2) the GPS data received from a dedicated short range communication (DSCR)-compliant GPS unit of the vehicle, and (3) a localization map.

20. The computer program product of claim 15, wherein the computer-executable code causes the onboard vehicle computer system to responsive to determining not to instruct the viewing device to display the graphical overlay:
- determine whether a predetermined amount of time occurred; and
- responsive to the predetermined amount of time occurring, determine, based on the head position data associated with the viewing device, whether to instruct the viewing device to display the graphical overlay.

* * * * *